(12) United States Patent
Ibaraki

(10) Patent No.: US 7,661,631 B2
(45) Date of Patent: Feb. 16, 2010

(54) FIXTURE

(75) Inventor: Masato Ibaraki, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 230 days.

(21) Appl. No.: 11/714,383

(22) Filed: Mar. 6, 2007

(65) Prior Publication Data

US 2007/0215758 A1    Sep. 20, 2007

(30) Foreign Application Priority Data

Mar. 6, 2006    (JP)    .............................. 2006-059975

(51) Int. Cl.
   *F16L 3/00*    (2006.01)
(52) U.S. Cl. ...................... 248/73; 248/74.2; 248/68.1; 248/74.1; 248/74.4
(58) Field of Classification Search .................... 248/65, 248/73, 74.1
   See application file for complete search history.

(56) References Cited

U.S. PATENT DOCUMENTS

| | | | | |
|---|---|---|---|---|
| 945,106 A | * | 1/1910 | Moodey | 403/344 |
| 2,884,214 A | * | 4/1959 | Wrobel | 248/74.3 |
| 3,429,985 A | * | 2/1969 | Czigler | 174/164 |
| 4,240,604 A | * | 12/1980 | Brach | 248/316.5 |
| 4,291,855 A | * | 9/1981 | Schenkel et al. | 248/74.1 |
| 4,372,593 A | * | 2/1983 | Kesselman | 292/307 B |
| 4,405,161 A | * | 9/1983 | Young et al. | 285/80 |
| 4,470,622 A | * | 9/1984 | Pate et al. | 285/419 |
| 4,471,982 A | * | 9/1984 | Nielsen, Jr. | 292/307 B |
| 4,478,381 A | * | 10/1984 | Pittion et al. | 248/71 |
| 4,564,163 A | * | 1/1986 | Barnett | 248/71 |
| 4,623,102 A | * | 11/1986 | Hough, Jr. | 248/68.1 |
| 4,624,432 A | * | 11/1986 | Salacuse | 248/316.5 |
| 4,653,716 A | * | 3/1987 | Sakaguchi | 248/316.5 |
| 4,669,688 A | * | 6/1987 | Itoh et al. | 248/74.2 |
| 4,779,828 A | * | 10/1988 | Munch | 248/74.3 |
| D307,541 S | * | 5/1990 | Tres | D8/396 |
| 5,015,013 A | * | 5/1991 | Nadin | 285/64 |
| D323,106 S | * | 1/1992 | Daigle et al. | D8/396 |
| 5,230,489 A | * | 7/1993 | White et al. | 248/74.2 |
| 5,277,387 A | * | 1/1994 | Lewis et al. | 248/74.2 |
| 5,385,373 A | * | 1/1995 | Love | 292/307 B |
| 5,390,876 A | * | 2/1995 | Hatano et al. | 248/73 |
| 5,494,245 A | * | 2/1996 | Suzuki et al. | 248/74.1 |
| 5,572,776 A | * | 11/1996 | Murphy et al. | 24/543 |

(Continued)

FOREIGN PATENT DOCUMENTS

JP    11-13942    1/1999

*Primary Examiner*—J. Allen Shriver, II
*Assistant Examiner*—Alaeddin Mohseni
(74) *Attorney, Agent, or Firm*—Gerald E. Hespos; Anthony J. Casella

(57)    ABSTRACT

An attaching portion (12) includes resiliently deformable holding pieces (24), each of which has a pressing portion (26). A clearance between pressing portions (23, 26) is less than the thickness of a bracket (B) in a free state where the holding pieces (24) are not deformed. The holding pieces (24) are deformed to widen the clearance between the pressing portions (23, 26) in the process of inserting the bracket (B) between the pressing portions (23, 26). Thus, insertion resistance does not become excessive. The bracket (B) is sandwiched between the pressing portions (23, 26) by resilient forces of the holding pieces (24) with the attaching portion (12) attached to the bracket (B). Therefore, the attaching portion (12) and the bracket (B) do not shake relative to each other.

10 Claims, 18 Drawing Sheets

U.S. PATENT DOCUMENTS

| | | | | |
|---|---|---|---|---|
| 5,590,859 A | * | 1/1997 | Lord | 248/62 |
| 5,681,126 A | * | 10/1997 | Lin | 403/313 |
| D386,670 S | * | 11/1997 | Phillips | D8/396 |
| 5,775,653 A | * | 7/1998 | Horney et al. | 248/230.8 |
| 5,820,048 A | * | 10/1998 | Shereyk et al. | 248/68.1 |
| 5,836,367 A | * | 11/1998 | Calabrese | 138/112 |
| 5,873,144 A | * | 2/1999 | Tupper et al. | 16/18 CG |
| 5,906,342 A | * | 5/1999 | Kraus | 248/74.1 |
| D420,569 S | * | 2/2000 | Evans | D8/396 |
| 6,042,062 A | * | 3/2000 | Sugiyama | 248/65 |
| 6,079,674 A | * | 6/2000 | Snyder | 248/74.3 |
| 6,164,604 A | * | 12/2000 | Cirino et al. | 248/74.3 |
| 6,186,454 B1 | * | 2/2001 | Olsen | 248/218.4 |
| D448,657 S | * | 10/2001 | Calvert | D8/396 |
| 6,604,725 B1 | * | 8/2003 | Thullen et al. | 248/316.5 |
| 6,682,025 B2 | * | 1/2004 | Turner et al. | 248/65 |
| 6,682,026 B2 | * | 1/2004 | Nagayasu | 248/74.2 |
| 6,809,257 B2 | * | 10/2004 | Shibuya | 174/481 |
| 6,899,304 B2 | * | 5/2005 | Bellmore et al. | 248/65 |
| 6,935,599 B2 | * | 8/2005 | van Walraven | 248/74.1 |
| 6,978,973 B1 | * | 12/2005 | Gretz | 248/74.1 |
| 7,041,903 B2 | * | 5/2006 | Odahara et al. | 174/659 |
| 7,114,686 B2 | * | 10/2006 | Andrigo | 248/71 |
| 2007/0215758 A1 | * | 9/2007 | Ibaraki | 248/74.1 |

* cited by examiner

FIXTURE

BACKGROUND OF THE INVENTION

1. Field of the Invention

The invention relates to a fixture to attach an article, such as a wiring harness, to an attachment base such as a vehicle.

2. Description of the Related Art

U.S. Pat. No. 5,390,876 discloses a fixture to attach an article, such as a wiring harness, to an attachment base, such as a vehicle. The fixture has two half pieces that can be united to surround the article that is to be attached. One half piece has a mount hole for receiving a plate-shaped bracket of the attachment base. The half piece is attached to the bracket by sandwiching the bracket between opposed surfaces of the inner surface of the mount hole.

Resistance created upon inserting the bracket into the mount hole is large if the thickness of the bracket exceeds a clearance between the pressing surfaces. Conversely, insertion resistance is smaller, but the bracket and the fixture shake relative to each other in an attached state if the thickness of the bracket is less than the clearance between the pressing surfaces.

The invention was developed in view of the above problem and an object thereof is to improve the attaching operability of a fixture to a bracket and to prevent the fixture and the bracket from shaking relative to each other.

SUMMARY OF THE INVENTION

The invention relates to a fixture for attaching an article, such as a wiring harness, to an attachment base, such as a vehicle. The fixture has at least two fixture parts to be united to at least partly surround the article to be attached. One fixture part includes an attaching portion with at least two pressing portions. The fixture is attached to the attachment base by arranging a bracket on the attachment base between the pressing portions. The attaching portion has at least one of the pressing portions and at least one resilient deforming portion that is deformable in directions to widen and narrow a clearance between the paired pressing portions. The clearance between the pressing portions is smaller than the thickness of the bracket in a free state where the resilient deforming portion is not deformed.

Insertion resistance does not become excessive while inserting the bracket between the paired pressing portions because the resilient deforming portion is deformed to widen the clearance between the pressing portions. Further, the paired pressing portions sandwich the bracket by the resilient force of the resilient deforming portion while the attaching portion is attached to the bracket. Hence, the attaching portion and the bracket do not shake relative to each other.

Two resilient deforming portions preferably are spaced apart in the width direction of the bracket.

The bracket might incline in the width direction with a contact position of the bracket and the resilient deforming portion as a supporting point if the resilient deforming portion is at only one position along the width direction of the bracket. However, the resilient deforming portions are spaced apart in the width direction of the bracket, and therefore the bracket will not incline in the width direction.

The attaching portion preferably has at least one retaining piece that is resiliently deformable in directions intersecting an attaching direction to the bracket. The retaining piece engages the bracket and prevents the attaching portion from being separated from the bracket.

The resilient deforming portion and the retaining piece preferably are arranged at the same side with respect to the bracket.

The resilient deforming portion and the retaining piece preferably have deformation spaces for permitting the resilient deformations in directions away from the bracket. Both the resilient deforming portion and the retaining piece are at the same side with respect to the bracket, and therefore both deformation spaces are at the same side with respect to the bracket. Accordingly, the attaching portion can be made smaller as compared to the case where the deformation space for the resilient deforming portion and the one for the retaining piece are at the opposite sides of the bracket.

The attaching portion preferably is a retaining piece that is resiliently deformable in directions intersecting an attaching direction to the bracket and engages the bracket to prevent the attaching portion from being separated from the bracket. The retaining piece for preventing separation of the attaching portion from the bracket doubles as the resilient deforming portion. Thus, the construction of the attaching portion is simpler as compared to the case where the resilient deforming portion is provided in addition to the retaining piece.

The retaining piece preferably is cantilevered to extend substantially along the attaching direction to the bracket. Thus, the retaining piece deforms resiliently and inclines due to interference of the projecting end of the retaining projection with the bracket in the process of attaching the bracket and the attaching portion. The retaining piece restores resiliently when the bracket and the attaching portion are attached properly to each other. Thus, the retaining projection enters the retaining hole so that the locking surface faces and contacts the edge of the retaining hole.

The retaining piece preferably has a retaining projection with a locking surface for engaging a retaining hole of the bracket so that the attaching portion does not separate from the bracket.

The retaining projection preferably has a protrusion formed by raising a part of the locking surface. The protrusion preferably is formed at the base end of the retaining projection. The retaining projection preferably is displaced in a direction to be distanced slightly from the edge of the retaining hole upon entering the retaining hole when the retaining piece resiliently restores. Thus, a small clearance forms between the locking surface and the edge of the retaining hole, which might result in shaking of the bracket and the attaching portion relative to each other in the attaching direction. However, the protrusion fills up the clearance between the edge of the retaining hole and the locking surface. Therefore, the bracket and the attaching portion will not shake relative to each other in the attaching direction.

The protrusion preferably fills at least part of the clearance between the retaining hole and the locking surface in a state where the bracket contacts a front stop and the retaining piece resiliently restored.

A front stop preferably is provided. The distal end edge of the bracket contacts the front stop when the bracket is inserted to a proper insertion position so that the bracket cannot be inserted any further.

A substantially H-shaped mounting hole preferably penetrates the attaching portion along an inserting direction of the bracket.

These and other objects, features and advantages of the present invention will become more apparent upon reading of the following detailed description of preferred embodiments and accompanying drawings. It should be understood that

DETAILED DESCRIPTION OF THE PREFERRED EMBODIMENTS

A fixture according to a first embodiment of the present invention is identified by the designation Ta in FIGS. 1 to 9. The fixture Ta is used for attaching a wiring harness W to an attachment base (not shown), such as a vehicle, body structure, device, frame element or the like. The wiring harness W has a plurality of wires (not shown) surrounded together by a corrugate tube Wa. Engaging grooves (not shown) extend circumferentially around the outer surface of the corrugate tube Wa and are disposed one after another along longitudinal direction of the corrugate tube Wa. A substantially plate-shaped bracket B projects up in a standing direction SD from the attachment base. Curved portions Ba are formed at opposite lateral edges of the bracket B along the standing direction SD (see FIG. 9). A substantially rectangular retaining hole H penetrates the bracket B in thickness direction.

Figure 1:
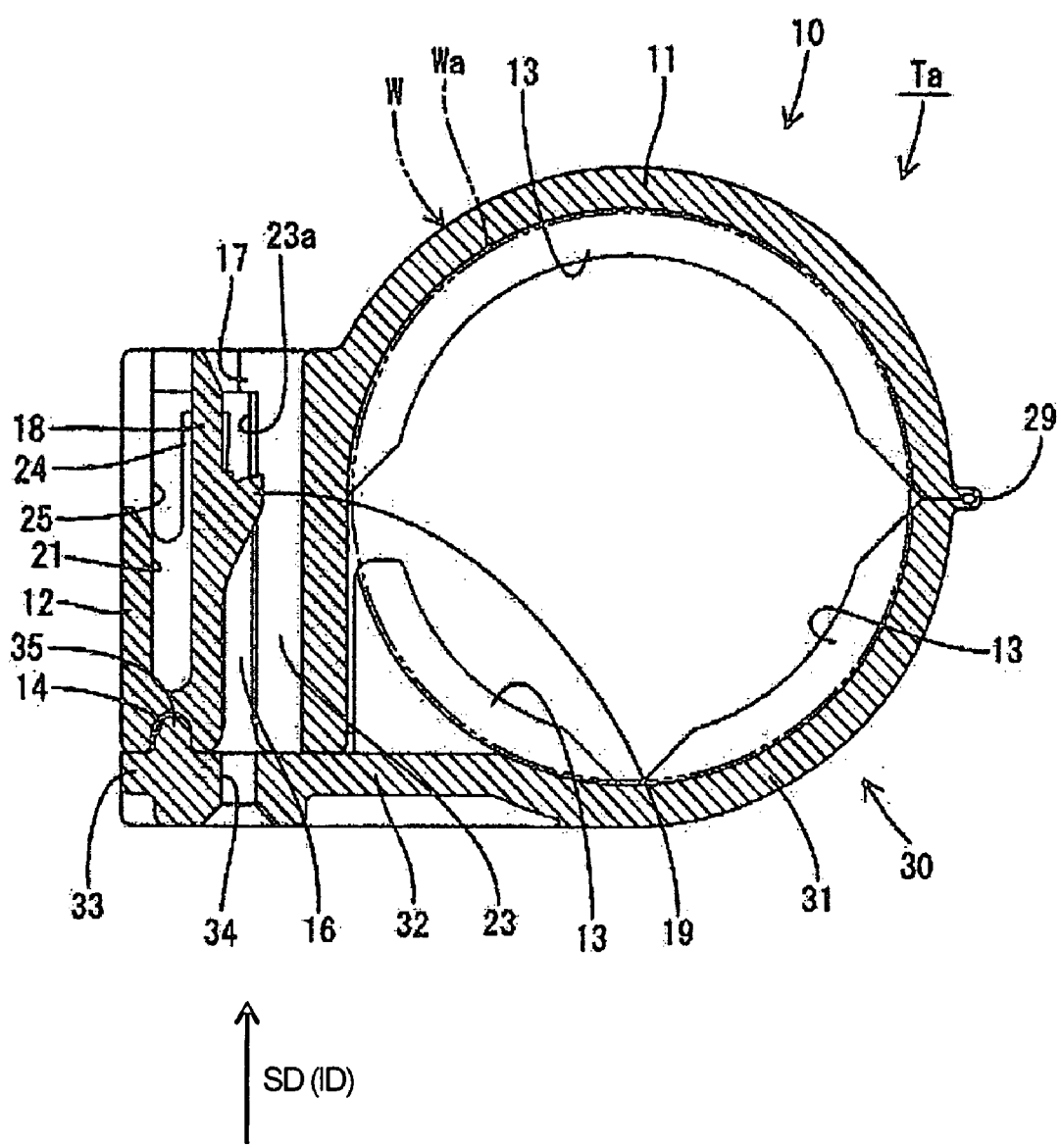
FIG. 1 is a horizontal section of a first embodiment.
Figure 2:
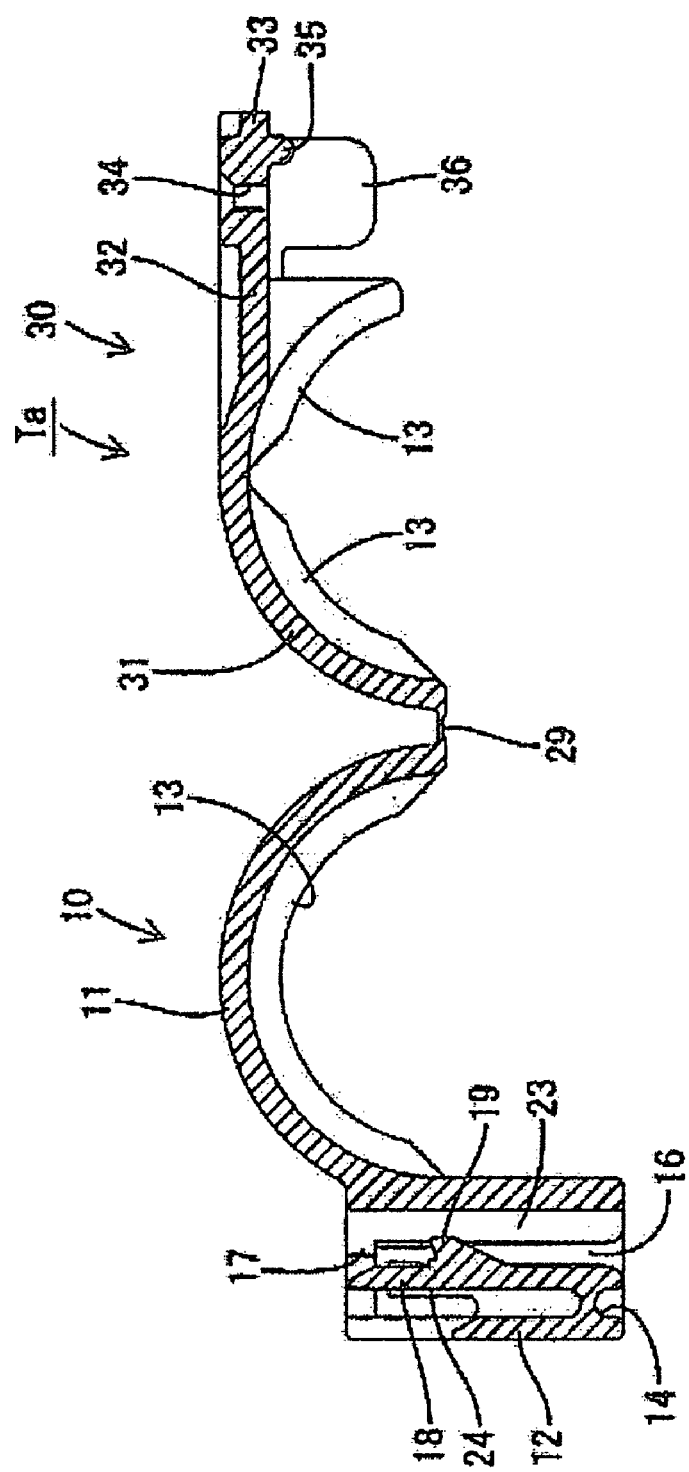
FIG. 2 is a vertical section showing a state before two half pieces are united.
Figure 3:
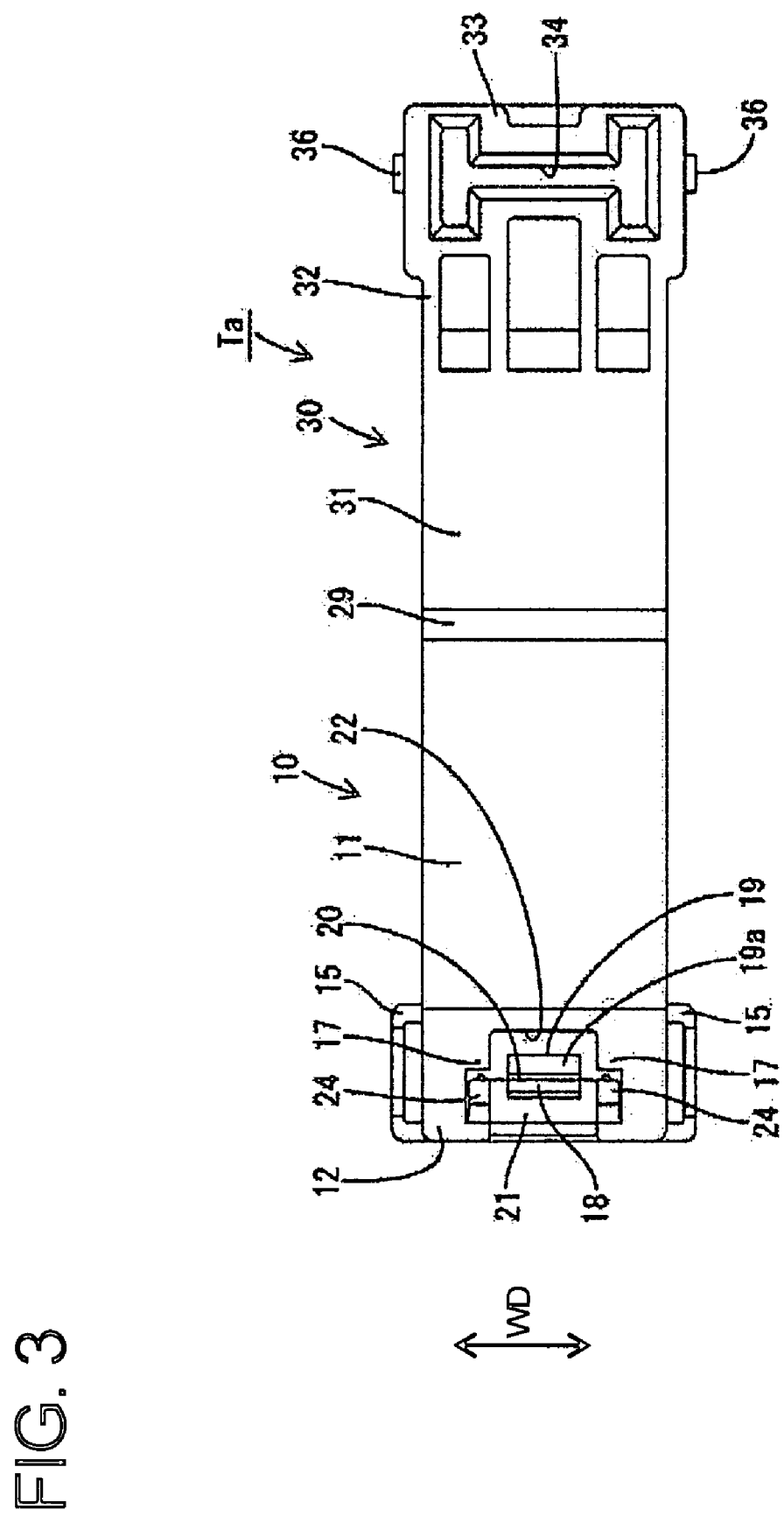
FIG. 3 is a plan view showing the state before the two half pieces are united.
Figure 4:
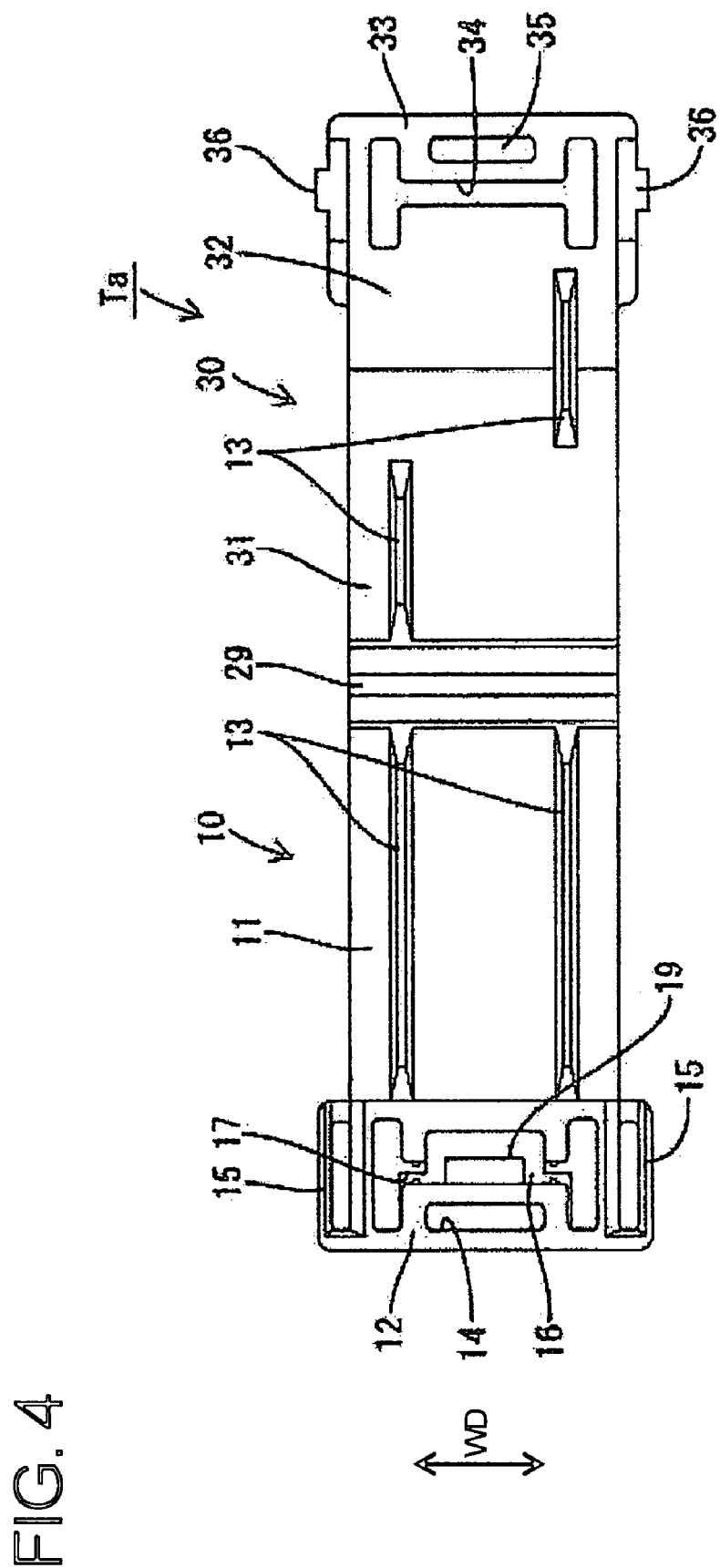
FIG. 4 is a bottom view showing the state before the two half pieces are united.
Figure 5:
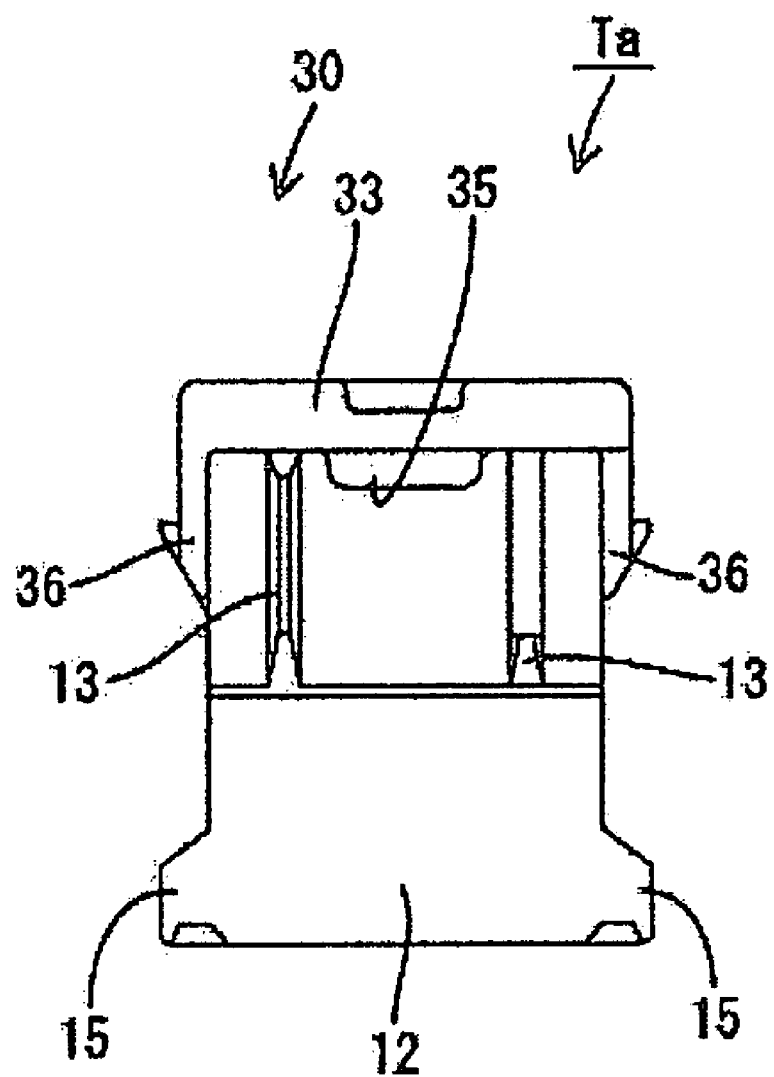
FIG. 5 is a side view showing the state before the two half pieces are united.
Figure 6:
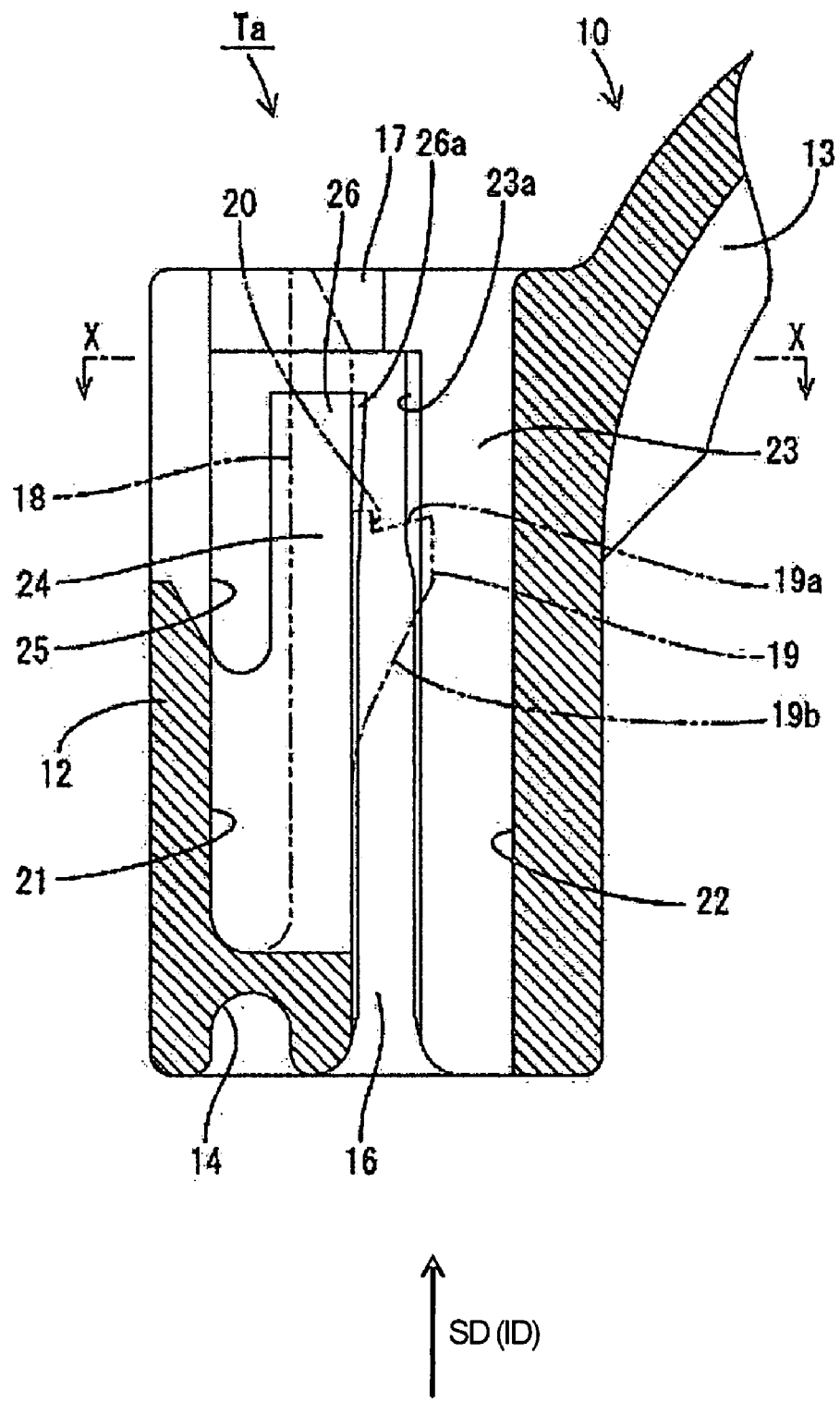
FIG. 6 is a partial enlarged vertical section of an attaching portion.
Figure 7:
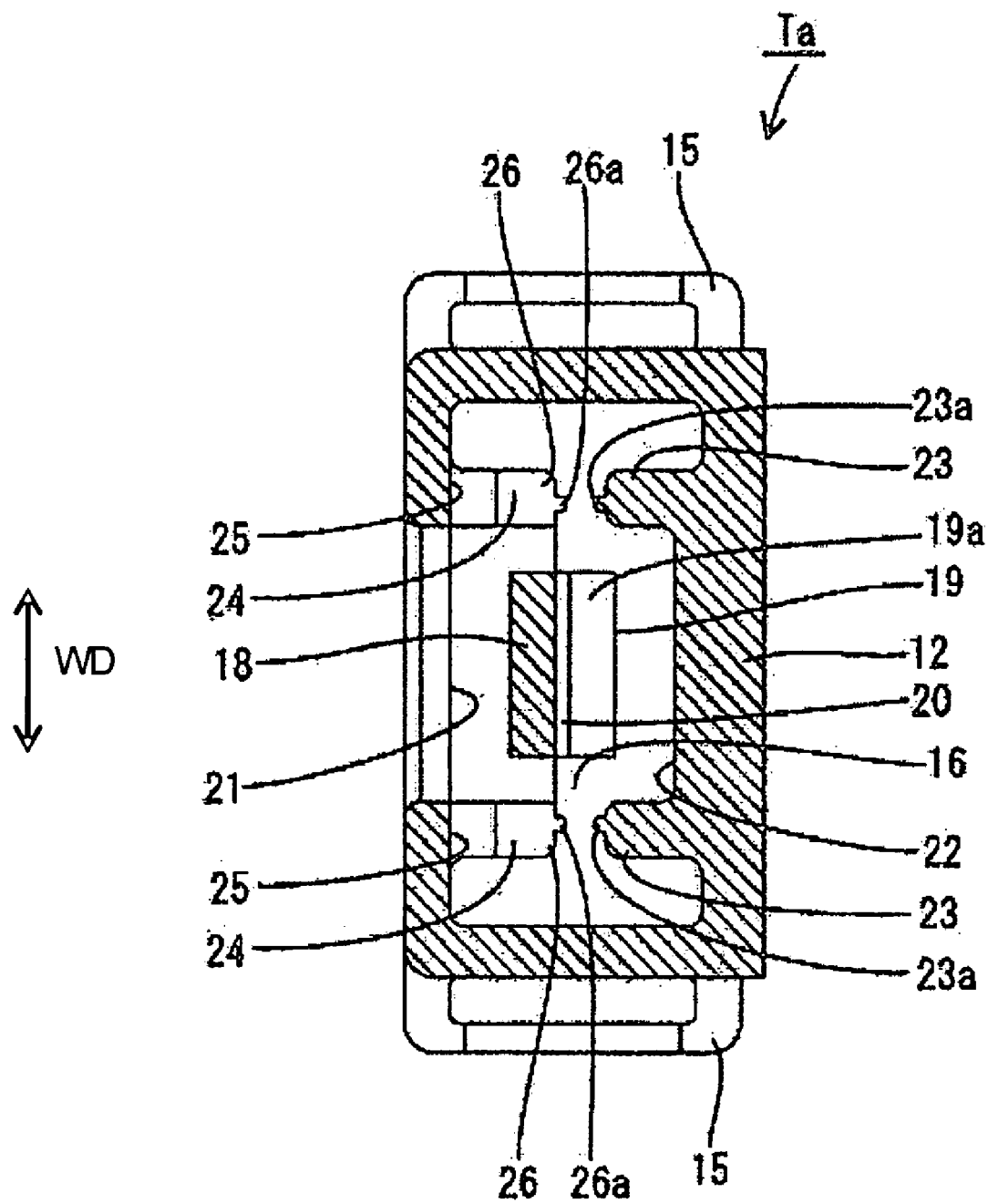
FIG. 7 is a section along X-X of FIG. 6.
Figure 8:
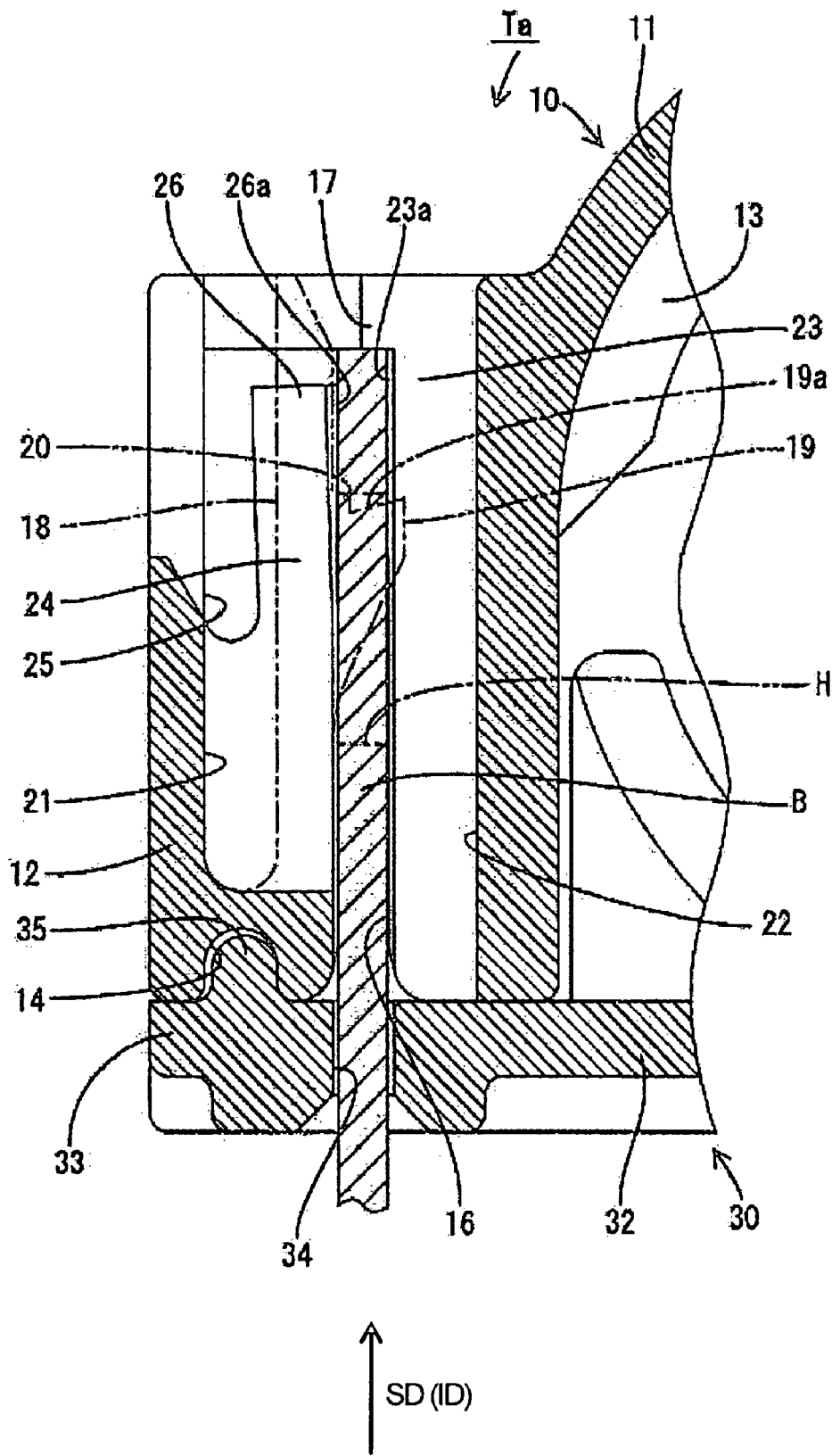
FIG. 8 is a partial enlarged vertical section showing a state where the attaching portion is attached to a bracket.
Figure 9:
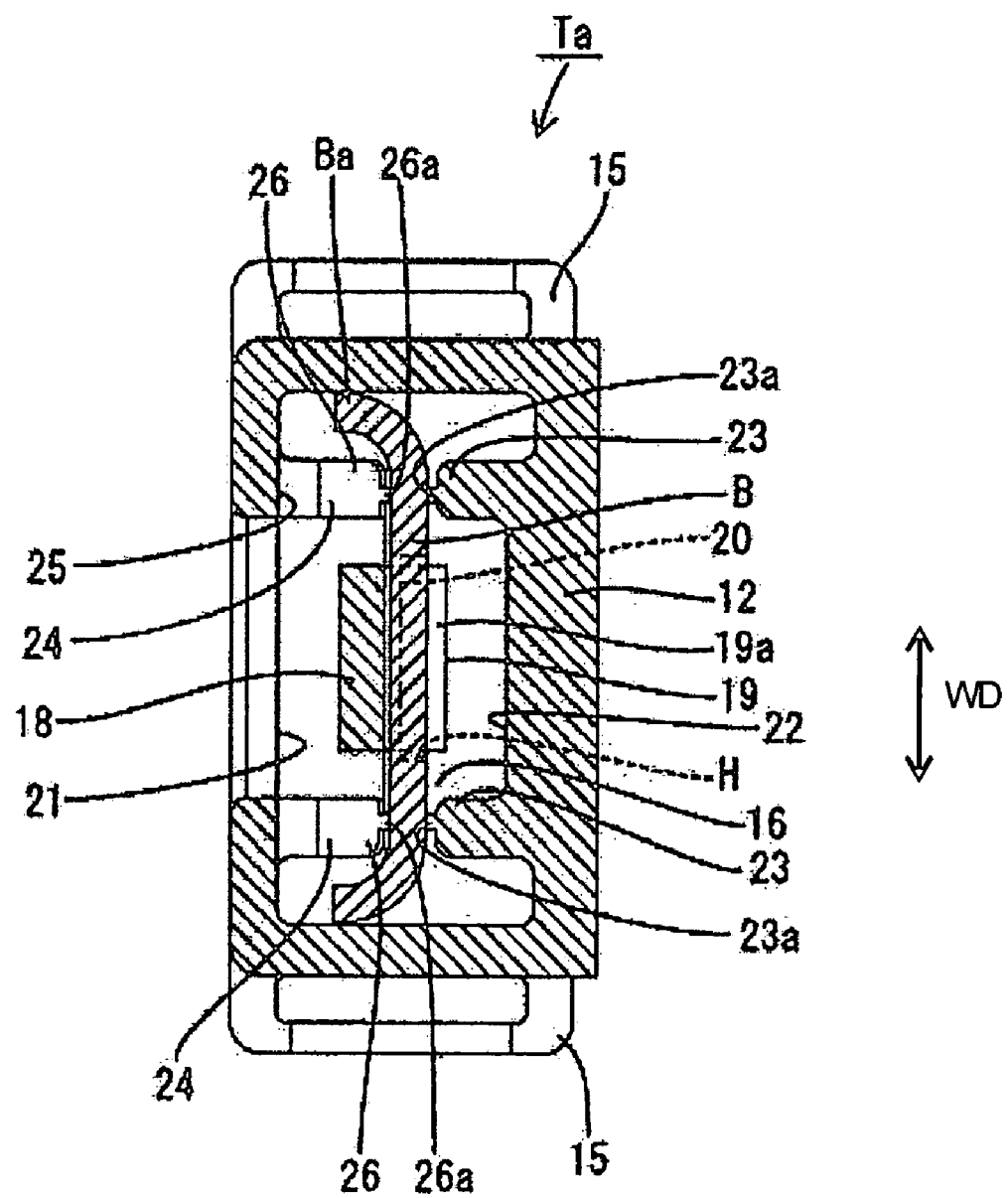
FIG. 9 is a partial enlarged horizontal section showing a state where the attaching portion is attached to the bracket.
Figure 10:
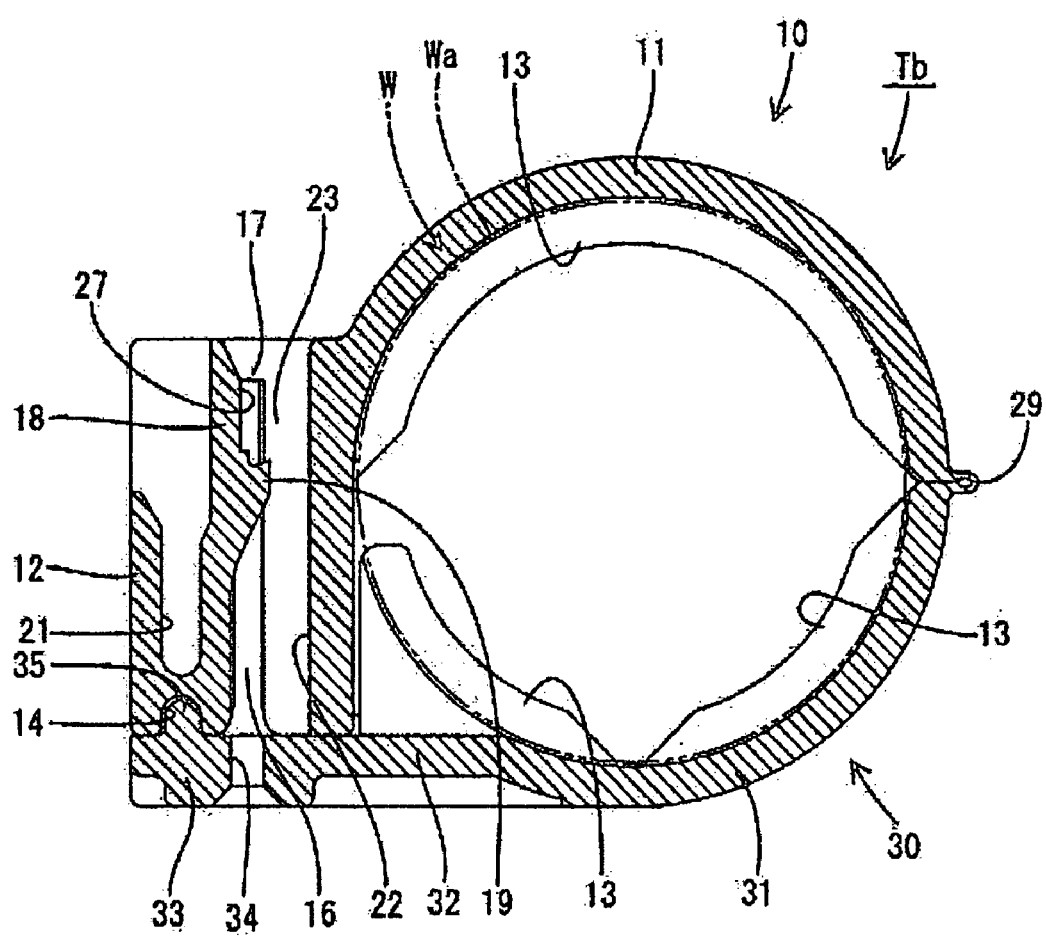
FIG. 10 is a horizontal section of a second embodiment.
Figure 11:
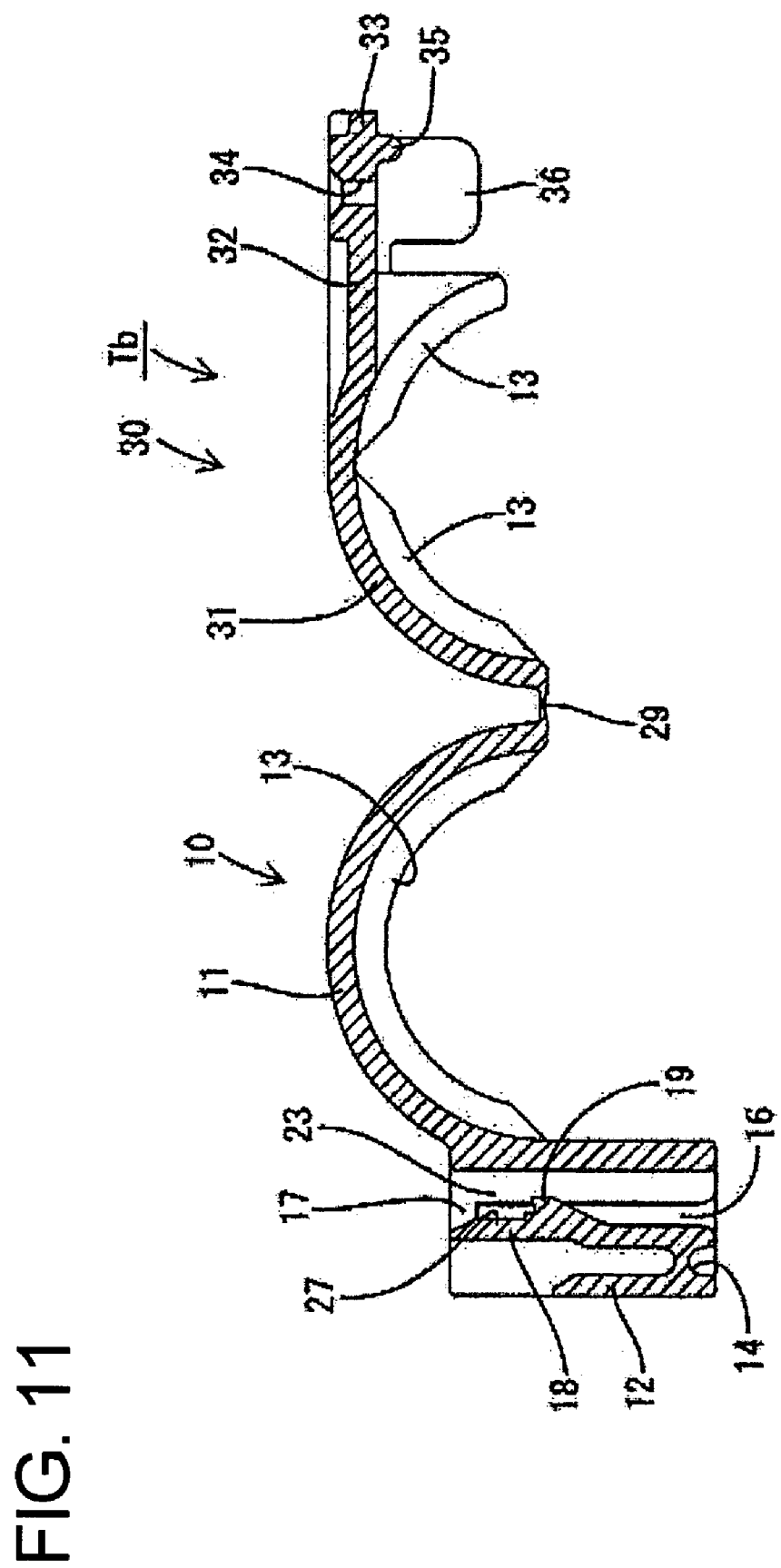
FIG. 11 is a vertical section showing a state before two half pieces are united.
Figure 12:
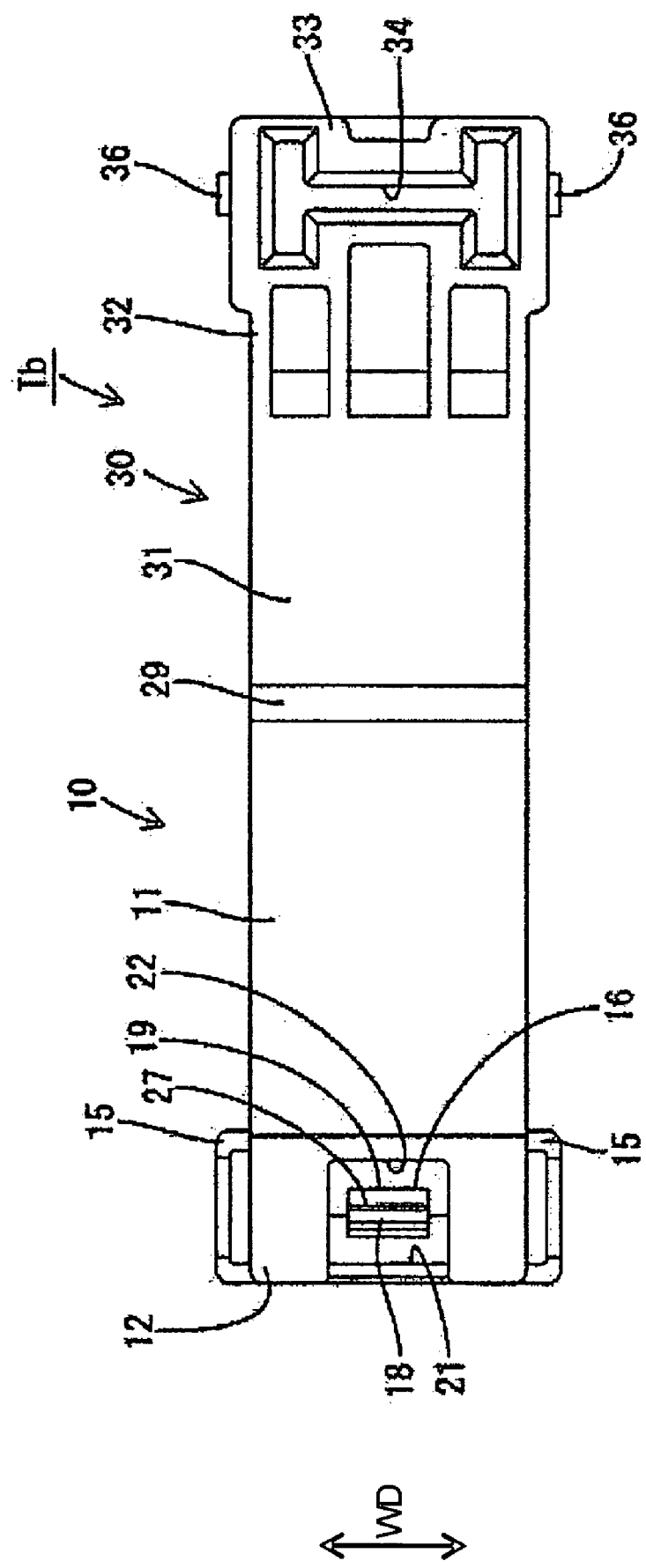
FIG. 12 is a plan view showing the state before the two half pieces are united.
Figure 13:
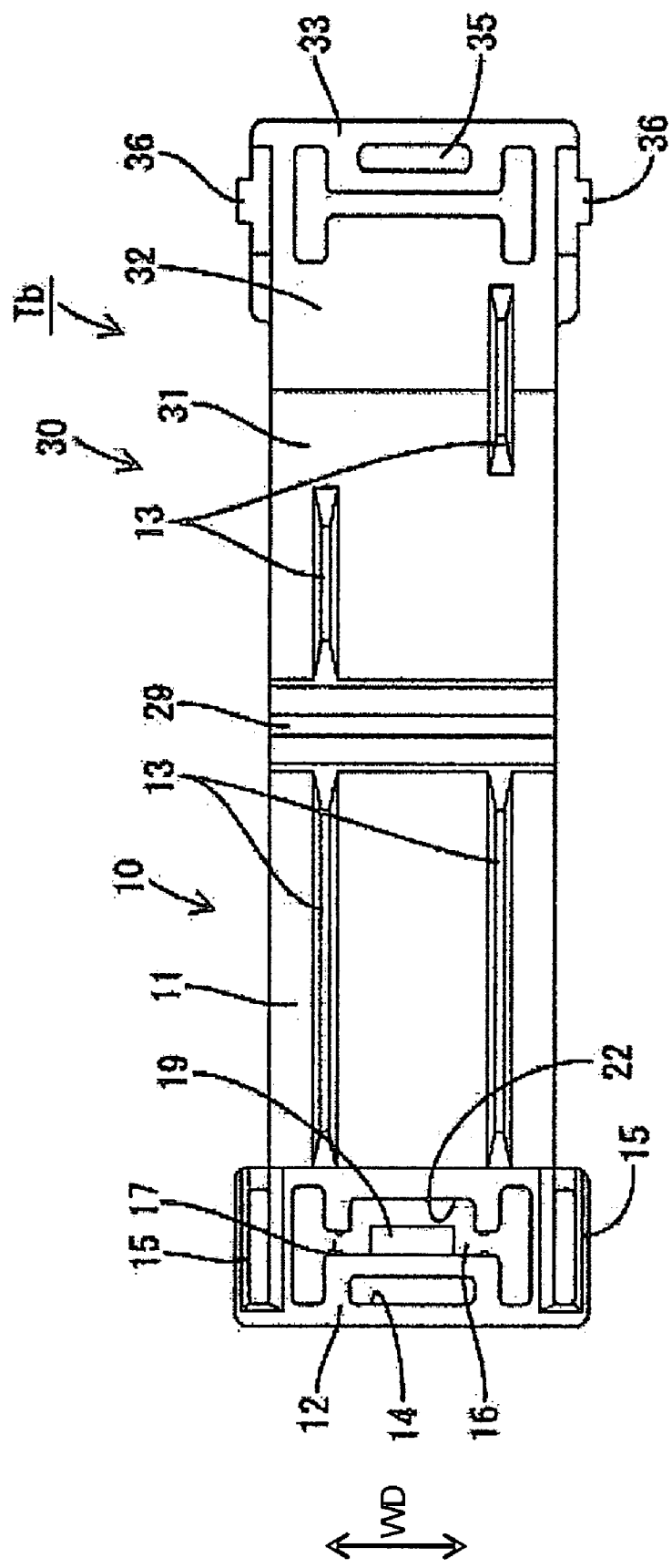
FIG. 13 is a bottom view showing the state before the two half pieces are united.
Figure 14:
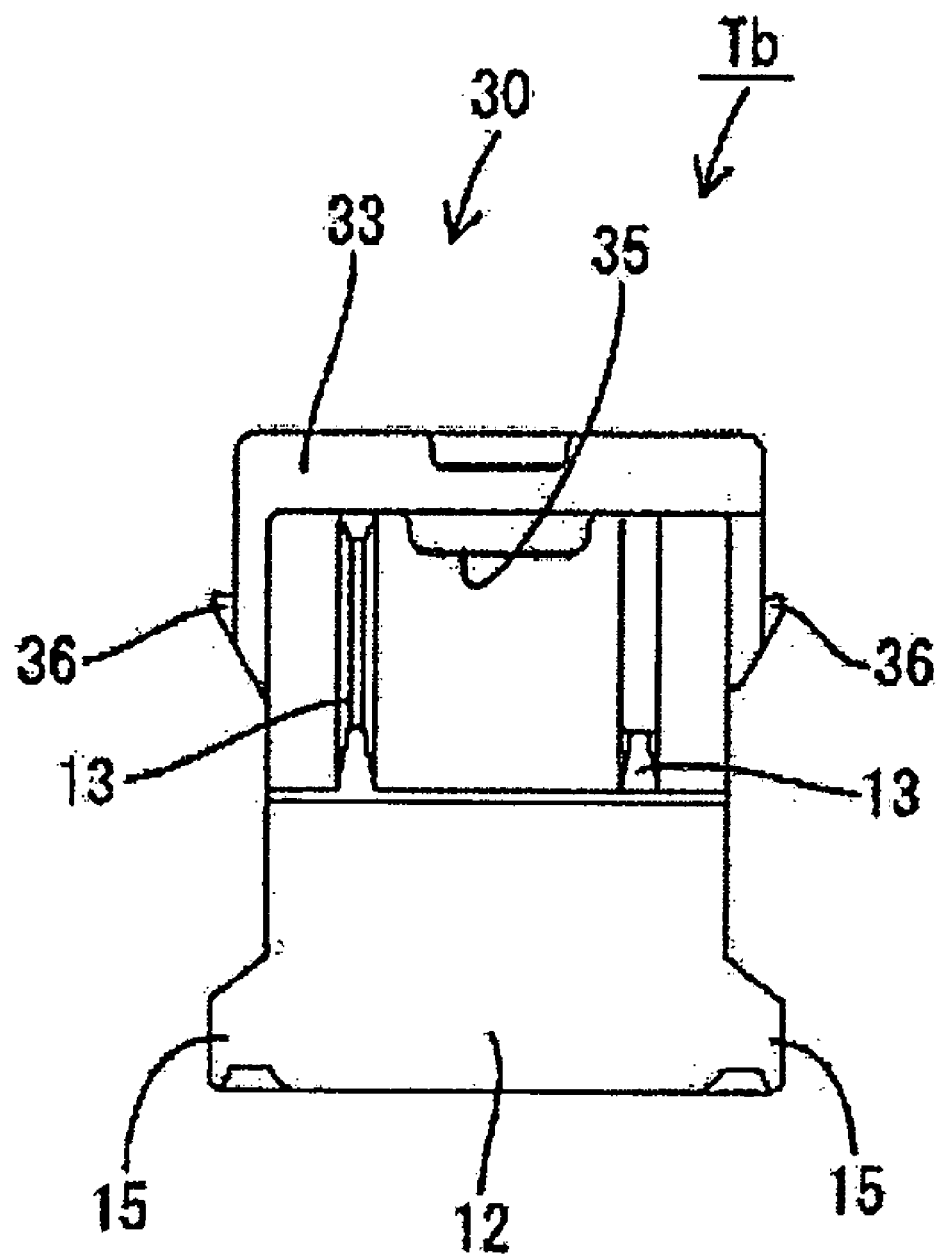
FIG. 14 is a side view showing the state before the two half pieces are united.
Figure 15:
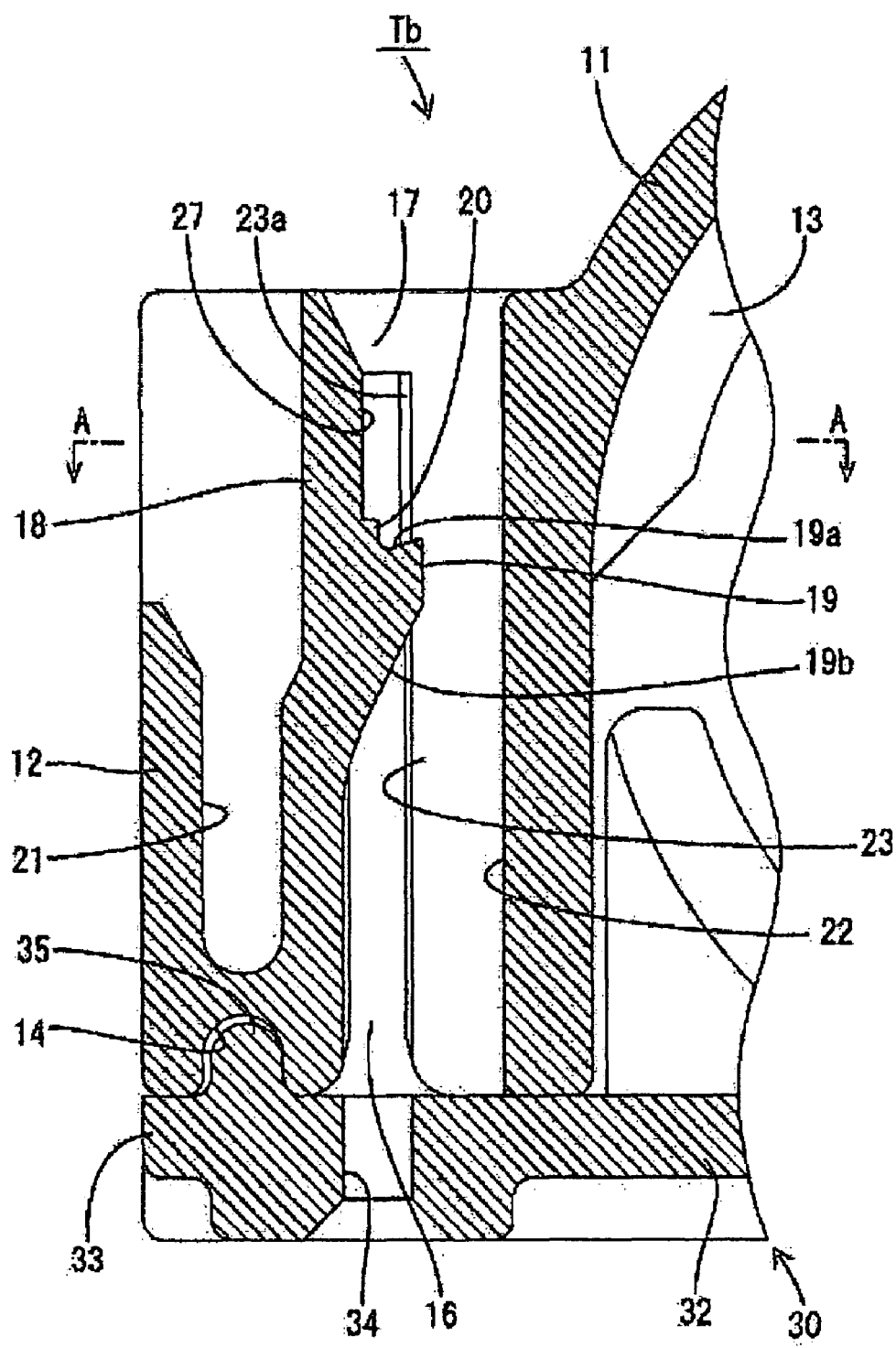
FIG. 15 is a partial enlarged vertical section of an attaching portion.
Figure 16:
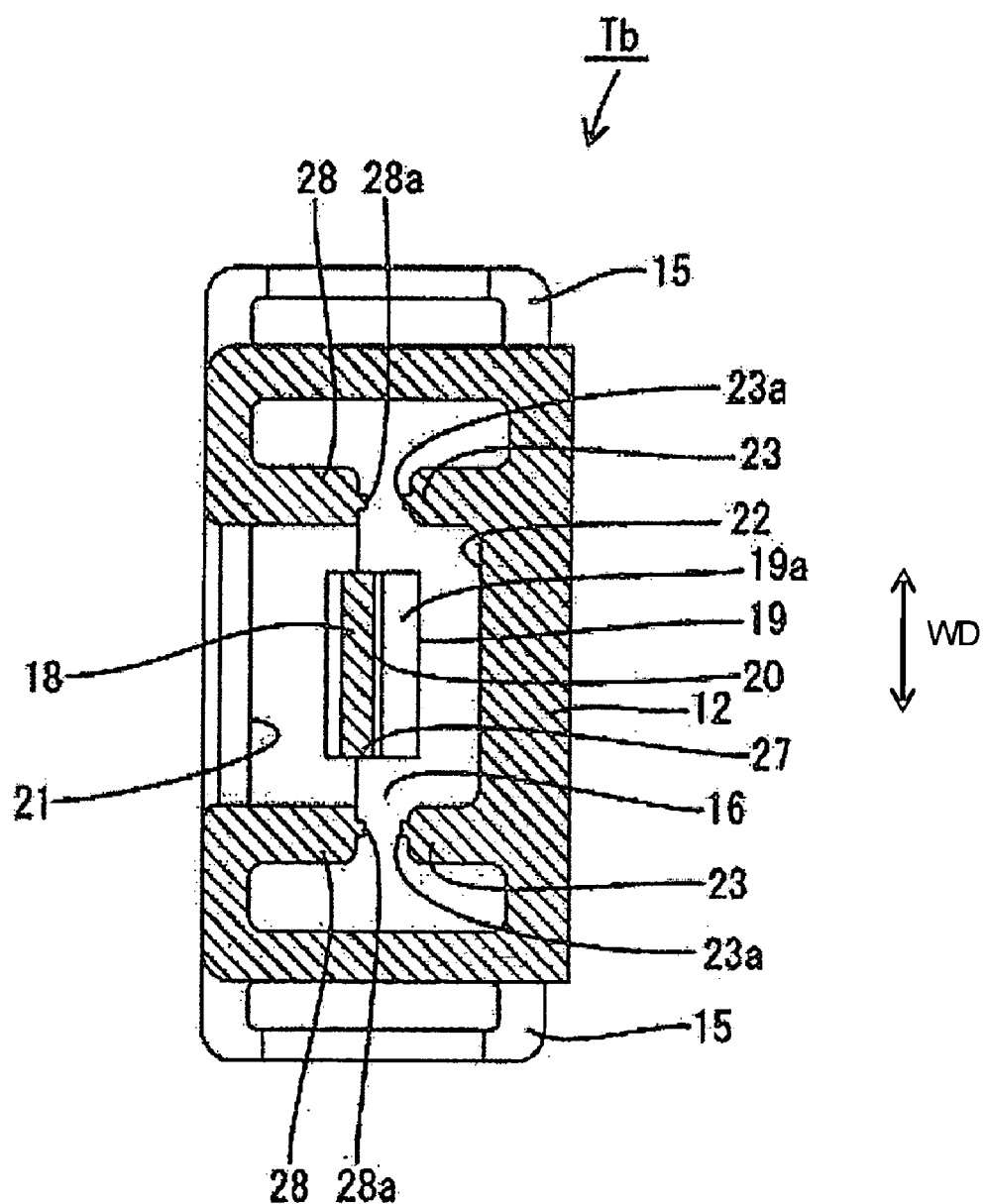
FIG. 16 is a section along A-A of FIG. 15.
Figure 17:
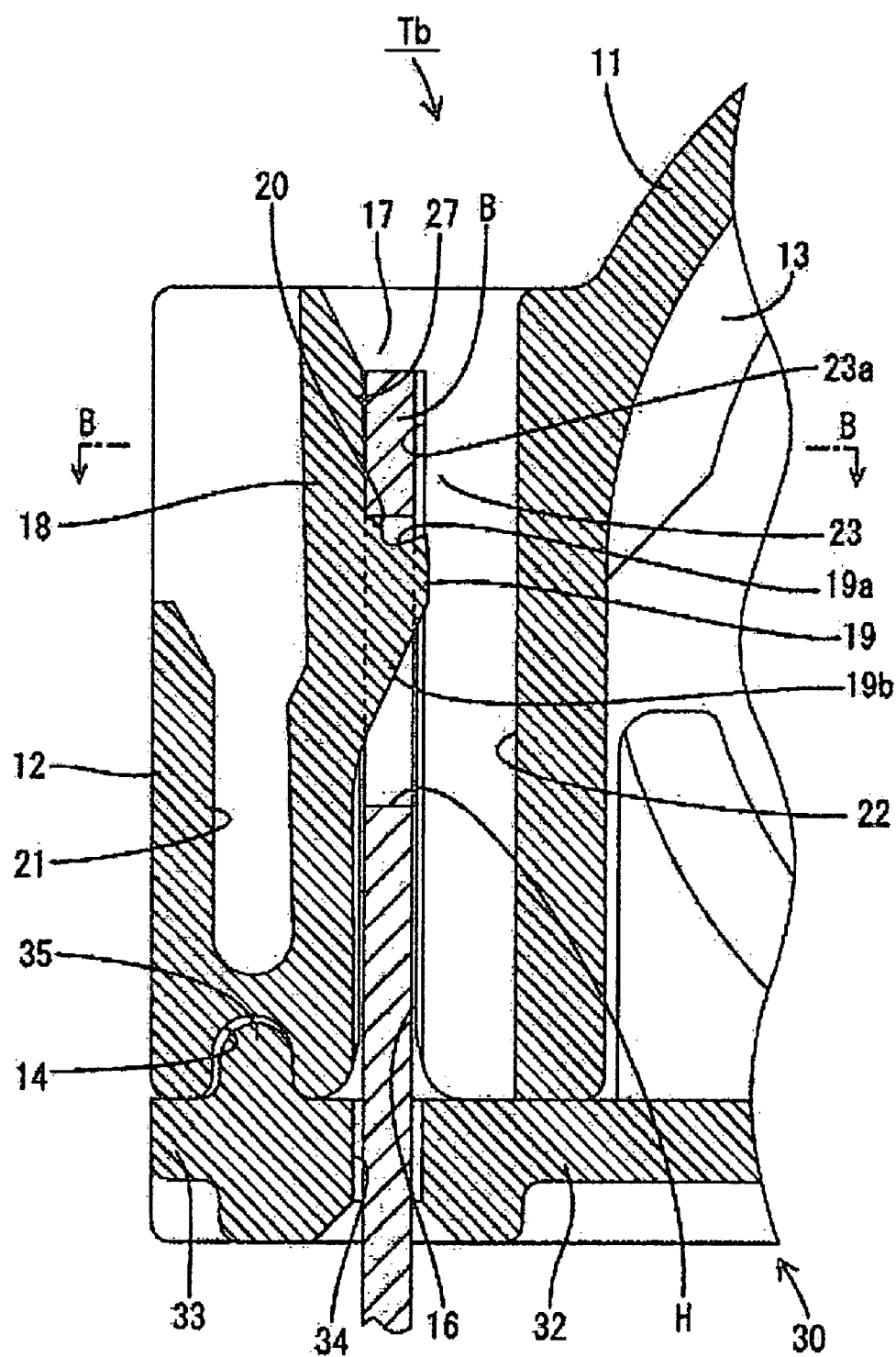
FIG. 17 is a partial enlarged vertical section showing a state where the attaching portion is attached to a bracket.
Figure 18:
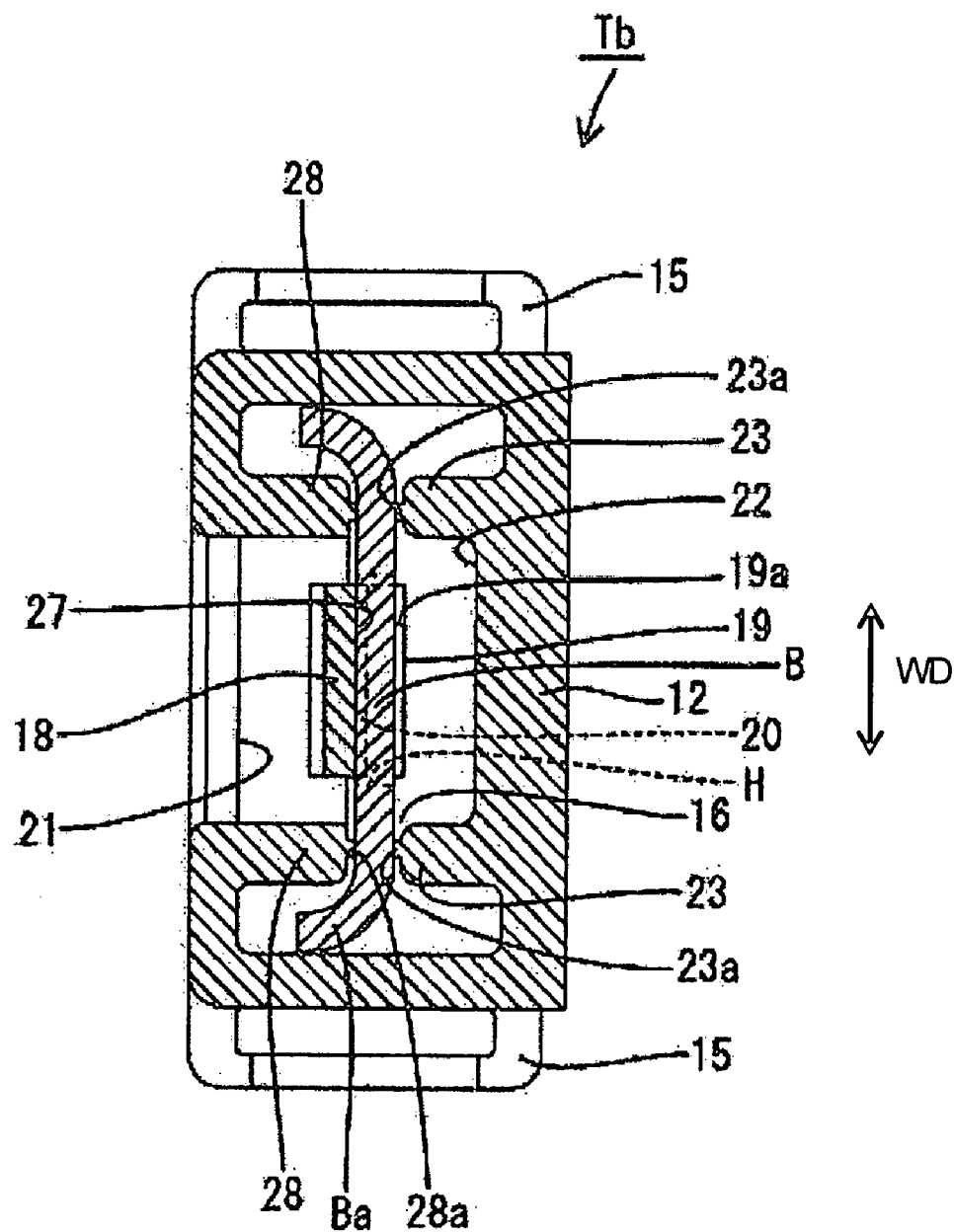
FIG. 18 is a partial enlarged horizontal section showing a state where the attaching portion is attached to the bracket.

The fixture Ta is made e.g. of synthetic resin and has first and second half pieces 10, 30 that are joined unitarily by a hinge 29. The half pieces 10, 30 can be rotated about the hinge 29 to define a substantially tubular shape for surrounding the corrugate tube Wa. The orientation of the fixture Ta shown in FIG. 1 is considered herein to define the vertical direction.

The first half piece 10 has a substantially semicircular portion 11 and an attaching portion 12 formed unitarily at an edge of the semicircular portion 11 opposite the hinge 29. Substantially semicircular engaging ribs 13 are formed on the inner curved surface of the semicircular portion 11 and are spaced apart in a width direction WD sufficiently for engaging the engaging grooves on the outer surface of the corrugate tube Wa. The attaching portion 12 is substantially in the form of a block that is tall along the standing direction SD. A positioning groove 14 is formed in the bottom surface of the attaching portion 12, and lock pieces 15 are formed at the upper ends of the left and right outer surfaces of the attaching portion 12. An H-shaped mount hole 16 penetrates the attaching portion 12 along an inserting direction ID that coincides with the standing direction SD. The bracket B is insertable from below into the mount hole 16 in the inserting direction ID. A front stop 17 is formed at the upper end of the mount hole 16 by narrowing an opening at the upper side.

A resiliently deformable retaining piece 18 is cantilevered up substantially along the inner surface of the mount hole 16 in the attaching portion 12. The retaining piece 18 is substantially at a widthwise middle of the mount hole 16, and the upper extending end of the retaining piece 18 is in the opening of the mount hole 16 in the upper surface of the attaching portion 12 so that the retaining piece 18 can be seen from the outside. A substantially triangular retaining projection 19 is formed on a surface of the retaining piece 18 facing the mount hole 16. A locking surface 19a is formed at the upper surface of the retaining projection 19 and is substantially normal to the inserting direction ID of the bracket B into the mount hole 16. A guiding slant 19b is formed at the lower surface of the retaining projection 19 is formed and is inclined smoothly with respect to the inserting direction ID of the bracket B. Further, a protrusion 20 projects up at the base end of the locking surface 19a of the retaining projection 19.

A deformation space 21 is formed inside the attaching portion 12 at a side of the retaining piece 18 opposite to the mount hole 16. Thus, the retaining piece 18 is deformable into the deformation space 21 while being inclined and retracting the retaining projection 19 from the mount hole 16. In a free state where the retaining piece 18 is not deformed, the surface of the retaining piece 18 where the retaining projection 19 is formed is substantially flush with the inner surface of the mount hole 16, and the retaining projection 19 projects into the mount hole 16. Further, a recess 22 for avoiding interference with the retaining projection 19 is formed in an inner surface of the mount hole 16 opposite the retaining piece 18. Two fixed pressing portions 23 are formed at opposite sides of the recess 22 and spaced apart in the width direction WD. Sliding contact ribs 23a project from the fixed pressing portions 23. Each sliding contact rib 23a extends substantially straight in the vertical direction and substantially parallel to the inserting direction ID of the bracket B over substantially the entire length of the mount hole 16. The projecting distance of each sliding contact rib 23a is longer in an area corresponding to an upper end of the mount hole 16. It should be noted that the front stop 17 is arranged to conform to the fixed pressing portions 23 with respect to the width direction WD.

Two holding pieces 24 are formed at opposite sides of the retaining piece 18 and are spaced apart in the width direction WD. The holding pieces 24 cantilever up along the inner surface of the mount hole 16, and are resiliently deformable to move towards deformation spaces 25 that communicate with the deformation space 21 for the retaining piece 18. The upper extending ends of the holding pieces 24 are below the upper extending end of the retaining piece 18, and the base ends of the holding pieces 24 are above the base end of the retaining piece 18. Therefore, the holding pieces 24 are longer than the retaining piece 18 along the inserting or standing direction SD or the inserting direction ID.

The holding pieces 24 are arranged in conformity with the fixed pressing portions 23 with respect to the width direction WD, and movable pressing portions 26 of the holding pieces 24 face the fixed pressing portions 23. Sliding contact ribs 26a project from the movable pressing portions 26 in a manner similar to the fixed pressing portions 23 and face the mount hole 16. Each sliding contact rib 26a extends substantially straight and vertically in a direction parallel to the inserting direction ID of the bracket B over substantially the entire length of the mount hole 16. The projecting distance of each sliding contact rib 26a is longer in an area corresponding to the upper end of the mount hole 16. A clearance between the sliding contact ribs 23a of the fixed pressing portions 23 and those 26a of the movable pressing portions 26 in a free state where the holding pieces 24 are not resiliently deformed is slightly larger than the thickness of the bracket B except in an upper end area where the clearance is less than the thickness of the bracket B. The sliding contact ribs 26a of the holding pieces 24 project more into the mount hole 16 than the surface of the retaining piece 18 where the retaining projection 19 is formed when the retaining piece 18 and the holding pieces 24 are in their free states.

The second half piece 30 includes a substantially semicircular portion 31. A substantially flat portion 32 is unitary with the semicircular portion 31 and extends substantially tangentially from an edge of the semicircular portion 31 opposite to the hinge 29. A lid 33 is formed unitarily at an edge of the flat portion 32 opposite to the substantially semicircular portion 31. Two substantially semicircular engaging ribs 13 are formed at inner surfaces of the semicircular portion 31 and the flat portion 32 and are offset sufficiently in the width direction WD for engaging in grooves of the corrugate tube Wa. The lid 33 is substantially flush with and continuous with the flat portion 32, and at least one substantially H-shaped receiving hole 34 similar to the mount hole 16 of the first half piece 10 vertically penetrates the lid 33. Further, a positioning projection 35 is formed on the upper surface of the lid 33, and two lock projections 36 are formed at the left and right edges of the lid 33.

The positioning projection 35 engages the positioning groove 14 when the first and second half pieces 10, 30 are united. Thus, the lid 33 aligns with the attaching portion 12 with respect to forward and backward directions and the transverse direction, the receiving hole 34 registers with the mount hole 16, and the lid 33 is substantially in surface contact with the bottom surface of the attaching portion 12. The lock projections 36 engage the lock pieces 15 to hold the lid 33 on the attaching portion 12 and to lock the first and second half pieces 10, 30 in the united state. In this united state, the corrugate tube Wa is held between both half pieces 10, 30 from radially opposite sides, and the engaging ribs 13 engage the engaging grooves to attach the fixture Ta to the corrugate tube W1 and the wiring harness W while preventing relative movements in the longitudinal direction of the corrugate tube W1.

The fixture Ta attached to the wiring harness W is assembled by fitting the mount hole 16 onto the bracket B that projects up in the standing direction SD. The bracket B passes the receiving hole 34 of the lid 33 and enters the mount hole 16 of the attaching portion 12. The upper end of the bracket B contacts the guiding slant 19B of the retaining projection 19 as the bracket B is inserted and deforms the retaining piece 18 into the deformation space 21. The upper end of the bracket B contacts the front stop 17 when the bracket B is inserted to a proper insertion position to prevent further insertion. At this time, the retaining piece 18 restores resiliently and the retaining projection 19 enters the retaining hole H of the bracket B. Thus, the upward facing locking surface 19a of the retaining projection 19 faces and contacts the upper edge of the retaining hole H to prevent an upward separating movement of the fixture Ta relative to the bracket B.

The cantilevered retaining piece 18 assumes an oblique posture as the bracket B deforms the retaining piece 18 from its free state. Additionally, the leading end of the retaining projection 19 displaces slightly up beyond its position in the free state of the retaining piece 18. The retaining projection 19 aligns with the retaining hole H when the bracket B is inserted to a proper position, and hence the retaining piece 18 restores resiliently so that the retaining projection 19 enters the retaining hole H. However, the leading end of the retaining projection 19 displaces down and away from the upper edge of the retaining hole H as the retaining piece 18 restores towards its free state. As a result, the leading end of the retaining projection 19 and the locking surface 19a thereof become spaced from the upper edge of the retaining hole H. However, the protrusion 20 projects up in the standing direction SD from the base end of the locking surface 19a. Thus, the protrusion 20 at least partly fills the clearance between the edge of the retaining hole H and the locking surface 19a when the retaining piece 18 restores resiliently and when the bracket B contacts the front stop 17. Therefore, the bracket B and the attaching portion 12 will not shake relative to each other in an attaching direction.

The protrusion 20 is formed at the base end of the retaining projection 19 in view of the fact that the leading end of the retaining projection 19 first enters the retaining hole H. However, the protrusion 20 engages the upper edge of the retaining hole H only at a final stage of the entrance of the retaining projection 19 into the retaining hole H. Accordingly, the protrusion 20 does not hinder the resilient restoring movement of the retaining piece 18 and the entrance of the retaining projection 19 into the retaining hole H.

The bracket B is sandwiched between the paired fixed pressing portions 23 and movable pressing portions 26 as the bracket B enters the mount hole 16 in the process of attaching the bracket B to the fixture Ta. The movable pressing portions 26 are provided on the holding pieces 24 and are deformable in directions to widen and narrow the clearance to the fixed pressing portions 23. Additionally, the clearance between the paired pressing portions 23, 26 is less than the thickness of the bracket B in the free state where the holding pieces 24 are not deformed. Accordingly, the holding pieces 24 deform to widen the clearance between the pressing portions 23, 26 in the process of inserting the bracket B between the fixed and movable pressing portions 23 and 26. As a result, insertion resistance does not become excessive. Further, the resilient forces of the holding pieces 24 keep sandwiching the bracket B between the pressing portions 23, 26 while the attaching portion 12 is attached to the bracket B. Thus, the attaching portion 12 and the bracket B do not shake relative to each other.

The bracket B might incline in the width direction about a contact of the bracket B and the holding piece 24, if the holding piece was at only one position along the width direction WD of the bracket B. However, two holding pieces 24 are spaced apart in the width direction WD of the bracket B and normal to the insertion direction ID of the bracket B into the mount hole 16. Therefore, the bracket B cannot incline in the width direction WD.

The retaining piece 18 is deformable in directions intersecting an attaching direction to the bracket B and engages the bracket B to prevent separation of the attaching portion 12 from the bracket B. The retaining piece 18 is provided in addition to the holding pieces 24. Therefore, the deformations spaces 21, 25 for permitting deformations of the retaining piece 18 and the holding pieces 24 away from the bracket B have to be defined. The retaining piece 18 and the holding pieces 24 are arranged at the same side with respect to the bracket B, and hence the deformation spaces 21, 25 also are arranged at the same side with respect to the bracket B. Accordingly, the attaching portion 12 can be made smaller in this embodiment as compared to the case where the deformation spaces for the holding pieces 24 and for the retaining piece 18 are at opposite sides of the bracket B.

A fixture according to a second embodiment of the invention is identified by the designation Tb in FIGS. 10 to 18. The fixture Tb can be used in substantially the same environment and for the same purposes as the fixture Ta of the first embodiment. Elements of the fixture Tb that are the same as or similar to elements of the fixture Ta are identified by the same reference numerals, but are not described again.

The fixture Tb of the second embodiment has a resiliently deformable retaining piece 18 with a retaining projection 19 facing the mount hole 16, similar to the first embodiment. However, the fixture Tb also has a movable pressing portion 27 on area of the retaining piece 18 facing the mount hole 16 and above the retaining projection 19 of the fixture Tb. The retaining projection 19 and the movable pressing portion 27 project into the mount hole 16 for the bracket B when the retaining piece 18 is in a free state and not deformed. A clearance in the thickness direction of the bracket B between the sliding contact ribs 23a of the fixed pressing portions 23 and the movable pressing portion 27 in the free state where the retaining piece 18 is not deformed is less than the thickness of the bracket B.

Two supports 28 are formed inside the attaching portion 12 at the opposite sides of the retaining piece 18. The supports 24 are spaced apart in the width direction WD and are at positions conforming with the fixed pressing portions 23. Sliding contact ribs 28a project on surfaces of the supports 28 facing the mount hole 16 and facing the fixed pressing portions 23. Each sliding contact rib 28a extends substantially straight and vertically in a direction substantially parallel to the inserting direction ID of the bracket B over substantially the entire length of the mount hole 16. A clearance between the sliding contact ribs 23a of the fixed pressing portions 23 and the sliding contact ribs 28a of the supports 28 is slightly larger than the thickness of the bracket B.

The fixture Tb is attached to the wiring harness W substantially in the same manner as the fixture Ta. The mount hole 16 of the fixture Tb then is assembled onto the bracket B that projects up along the standing direction SD. More particularly, the bracket B passes the receiving hole 34 of the lid 33 and enters the mount hole 16 of the attaching portion 12. The upper end of the bracket B contacts the guiding slant 19B of the retaining projection 19 and deforms the retaining piece 18 towards the deformation space 21 as the bracket B is inserted. The upper end of the bracket B contacts the front stop 17 when the bracket B is inserted to a proper insertion position to prevent further insertion. At this time, the retaining piece 18 restores resiliently and the retaining projection 19 enters the retaining hole H of the bracket B. Thus, the upward facing locking surface 19a of the retaining projection 19 faces the upper edge of the retaining hole H to prevent an upward separating movement of the fixture Tb relative to the bracket B. As in the first embodiment, the protrusion 20 projects up in the standing direction SD from the base end of the locking surface 19a. Thus, the protrusion 20 at least partly fills the clearance between the edge of the retaining hole H and the locking surface 19a when the retaining piece 18 restores resiliently and when the bracket B contacts the front stop 17.

Therefore, the bracket B and the attaching portion 12 will not shake relative to each other in an attaching direction. Furthermore, the protrusion 20 of the fixture Tb engages the upper edge of the retaining hole H only at a final stage of the entrance of the retaining projection 19 into the retaining hole H, substantially as in the first embodiment. Accordingly, the protrusion 20 does not hinder the resilient restoring movement of the retaining piece 18 and the retaining projection 19 can enter the retaining hole H.

The bracket B is sandwiched between the paired fixed pressing portions 23 and movable pressing portions 27 as the bracket B enters the mount hole 16 in the process of attaching the bracket B to the fixture Tb. The movable pressing portions 27 are provided on the retaining piece 18 and are deformable in directions to widen and narrow the clearance to the fixed pressing portions 23. Additionally, the clearance between the paired pressing portions 23, 27 is less than the thickness of the bracket B in the free state where the retaining piece 18 is not deformed. Accordingly, the retaining piece 18 deforms to widen the clearance between the pressing portions 23, 27 in the process of inserting the bracket B between the fixed and movable pressing portions 23 and 27. As a result, insertion resistance does not become excessive. Further, the resilient forces of the retaining piece 18 keep sandwiching the bracket B between the pressing portions 23, 27 while the attaching portion 12 is attached to the bracket B. Thus, the attaching portion 12 and the bracket B do not shake relative to each other.

The supports 28 are provided to touch the bracket B at the same side as the retaining piece 18 and are not deformable. Thus, there is no likelihood of plastically deforming the retaining piece 18 beyond the resiliency limit thereof by the interference with the bracket B. Further, the supports 28 are provided at the opposite sides of the retaining piece 18 with respect to the width direction WD. Thus, the bracket B will not incline in the width direction WD.

Further, the retaining piece 18 for preventing the separation from the bracket B doubles as a resilient deforming portion for resiliently sandwiching the bracket B in this embodiment. Thus, the structure of the attaching portion 12 can be simplified as compared to the case where a resilient deforming portion is provided in addition to the retaining piece 18.

The invention is not limited to the above described and illustrated embodiments. For example, the following embodiments are also embraced by the technical scope of the present invention as defined by the claims.

Although only one of the paired pressing portions is formed on the resilient deforming portion (holding piece or retaining piece) in the foregoing embodiments, both pressing portions may be formed on the resilient deforming portion. In other words, two resilient deforming portions may be arranged to sandwich the bracket therebetween.

The retaining piece and the holding pieces are cantilevered in the same direction in the first embodiment. However, the extending directions of the retaining piece and the holding pieces may be opposite to each other.

A construction of the second embodiment for sandwiching the bracket utilizing the resilient force of the retaining piece may be added to the first embodiment.

The holding pieces contact the bracket from the same side as the retaining piece in the first embodiment. However, the holding pieces may contact the bracket from a side opposite to the retaining piece.

The holding pieces formed with the pressing portions are provided at two positions spaced apart in the width direction of the bracket in the first embodiment. However, only one holding piece may be provided. In such a case, the position of the holding piece may be at a widthwise middle of the bracket or may be deviated from the widthwise middle of the bracket.

Two holding pieces formed with the pressing portions are arranged at opposite sides of the retaining piece in the first embodiment. However, two retaining pieces with no pressing portion may be arranged at the opposite sides of one holding piece formed with a pressing portion.

The holding pieces of the first embodiment are cantilevered in the inserting direction of the bracket into the mount hole. However, the holding pieces may extend in the opposite direction.

The protrusion that projects at the base end of the retaining projection may be omitted.

The construction of the first embodiment for sandwiching the bracket by resilient forces of the holding pieces may be added to the second embodiment.

The retaining piece of the second embodiment has the pressing portion at only one position along the width direction of the bracket. However, plural retaining pieces may be provided at positions spaced apart in the width direction of the bracket and each may have a pressing portion.

The retaining piece of the second embodiment is cantilevered in the inserting direction of the bracket into the mount hole. However, the retaining piece of the second embodiment may be cantilevered in the opposite direction.

What is claimed is:

1. A fixture for fixing an article relative to a bracket, the bracket having a thickness and a retaining hole extending into the bracket along a direction of the thickness of the bracket, the fixture comprising: first and second fixture parts configured to be secured relative to one another for at least partly surrounding the article, the first fixture part including an attaching portion with a mount hole for receiving the bracket along an inserting direction, the attaching portion further including a retaining piece in the mount hole, the retaining piece being resilient deformable in directions intersecting the inserting directing and having a retaining projection engageable with the retaining hole of the bracket, two spaced-apart resiliently deformable pressing portions cantilevered in the inserting direction at positions spaced from the retaining piece, two opposed pressing portions aligned respectively with the resiliently deformable pressing portions, a minimum clearance between the opposed pressing portions and the corresponding deformable pressing portions in a free state where the resiliently deformable pressing portions are not deformed being less than the thickness of the bracket, whereby the bracket can be sandwiched between the deformable and opposed pressing portions.

2. The fixture of claim 1, wherein the resiliently deformable pressing portions and the retaining piece are at a common side of the mount hole.

3. The fixture of claim 1, wherein the retaining piece is cantilevered substantially along the attaching direction to the bracket.

4. The fixture of claim 1, wherein the retaining projection is formed with a protrusion that projects from the locking surface adjacent a base end of the retaining projection.

5. The fixture of claim 4, wherein the protrusion at least partly fills a clearance between the retaining hole and the locking surface when the retaining piece is restored resiliently.

6. The fixture of claim 1, wherein a front stop portion is provided for contacting an end edge of the bracket to limit insertion of the bracket when the bracket is inserted to a proper insertion position.

7. The fixture of claim 1, wherein the mount hole is substantially H-shaped and penetrates the attaching portion substantially along the inserting direction of the bracket.

8. The fixture of claim 1, wherein the opposed and resilient deformable pressing portions are configured so that the minimum clearance between the opposed and resiliently deformable pressing portions is substantially adjacent an extending end of each of the cantilevered resiliently deformable pressing portions.

9. The fixture of claim 8, wherein the resilient deformable pressing portions are cantilevered from a base end, a clearance between the opposed and resiliently deformable pressing portions at positions aligned with the base ends of the resilient deformable pressing portions being greater than the thickness of the bracket.

10. The fixture of claim 1, wherein each of the pressing portions has a rib facing into the mount hole and extending substantially along the inserting direction.

* * * * *